United States Patent [19]

Tonari et al.

[11] 3,857,360

[45] Dec. 31, 1974

[54] UHF CHANNEL INDICATING MECHANISM

[75] Inventors: Hirohiko Tonari, Kyoto; Satoshi Kitaichi; Masaru Imai, both of Osaka, all of Japan

[73] Assignee: Matsushita Electric Industrial Co., Ltd., Osaka, Japan

[22] Filed: June 14, 1972

[21] Appl. No.: 262,469

[30] Foreign Application Priority Data

June 18, 1971 Japan .............................. 46-44400

[52] U.S. Cl. .............. 116/124.2, 74/10.41, 325/464, 334/86

[51] Int. Cl. .............................................. N03j 1/02

[58] Field of Search ........... 116/124.1, 124.2, 124.3, 116/124.4, 133; 74/10.15, 10.22, 10.29, 10.41, 10.8, 10.54; 325/455, 464; 334/86, 87

[56] References Cited

UNITED STATES PATENTS

| | | | |
|---|---|---|---|
| 1,661,159 | 3/1928 | Barnett | 116/124.2 R X |
| 3,270,571 | 9/1966 | Leedom | 74/10.41 |
| 3,307,414 | 3/1967 | Naber et al. | 74/10.54 X |
| 3,529,478 | 9/1970 | Hayakawa | 74/10.54 |
| 3,618,406 | 11/1971 | Mohri et al. | 74/10.54 |

*Primary Examiner*—Louis J. Capozi

*Attorney, Agent, or Firm*—Wenderoth, Lind & Ponack

[57] ABSTRACT

A channel indicating mechanism for a UHF tuner. The mechanism is for use with a tuner having a detent controlled tuner control shaft which is moved through a predetermined angle for each movement of the control shaft to change a tuner from one UHF channel to the next. The indicating mechanism has channel indicating discs having numbers thereon which, when the discs are rotated, are positioned to form two digit channel numbers. The disc for indicating the one's number is driven step by step from the tuning shaft, the driving means for the disc for indicating the ten's number is provided which rotates the other disc one position each time the one disc has been moved through ten steps.

3 Claims, 5 Drawing Figures

UHF CHANNEL INDICATING MECHANISM

BACKGROUND OF THE INVENTION

The present invention relates to channel indicating mechanisms for a UHF tuner, and more particularly to channel indicating mechanisms for a detent type UHF tuner having a tuning shaft rotatable step-by-step under control of a detent means.

The channel indication in a conventional detent type UHF turner is given by indicating numbers provided on a single disc which is mounted on and rotated by a tuning shaft at a reduced rotational speed. For the UHF band the U.S.A. which includes 70 channels, the dimensions of the indicating disc are usually quite large to cover all of the channels. Channel indicating mechanisms can be constructed which are compact in size by using a pair of indicating discs, each of which has the numbers 0 – 9 written thereon respectively, for indicating channel numbers which have two figures, such as channels 14–83. Thus, such a pair of small indicating discs can be used for all the channels of the UHF band in the U.S.A. However, it is necessary for such a channel indicating mechanism to have driving means for rotating one of the discs through a predetermined angle for each complete revolution of the other disc. Such a driving means is apt to make the construction complicated and bulky.

BRIEF SUMMARY OF THE INVENTION

It is, therefore, an object of the present invention to provide improved channel indicating mechanisms for a detented type UHF tuner.

It is another object of the p,esent invention to provide an improved channel indicating mechanism for a detent type UHF tuner which is compact in size and inexpensive to produce.

It is a further object of the present invention to provide an improved channel indicating mechanism for a detented type UHF tuner wherein indicating numbers for the UHF channel can be easily observed by using novel channel indicating means including a pair of small indicating discs.

These objects of the present invention are achieved by a channel indicating mechanism for a UHF tuner having a tuner control shaft adjustable to tune said UHF tuner to any one of the UHF television channels and a tuning mechanism which has a tuning shaft for driving said tuner control shaft through a predetermined rotational angular step and a fine tuning shaft for rotating said tuner control shaft continuously through a small rotational angle within the angle of said angular step. The tuning mechanism has a detent cam mounted on said tuning shaft which has a plurality of gear teeth at the periphery thereof, and detent means for imparting a spring force between two adjacent teeth of said detent cam so as to impart a click motion during the rotation of said tuning shaft. Channel indicating means is geared to said detent cam and driven step-by-step by said tuning shaft through said detent cam upon rotation of said tuning shaft under the action of said detent means so as to indicate the channel number to which the UHF tuner is tuned.

BRIEF DESCRIPTION OF THE DRAWINGS

Figure 1:
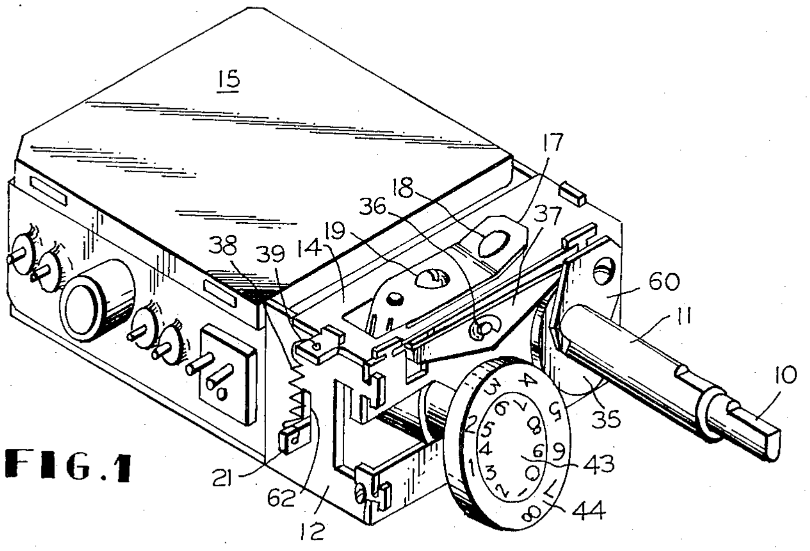
FIG. 1 is a perspective view of the detent type UHF tuner provided with channel indicating mechanism according to the present invention.
Figure 2:
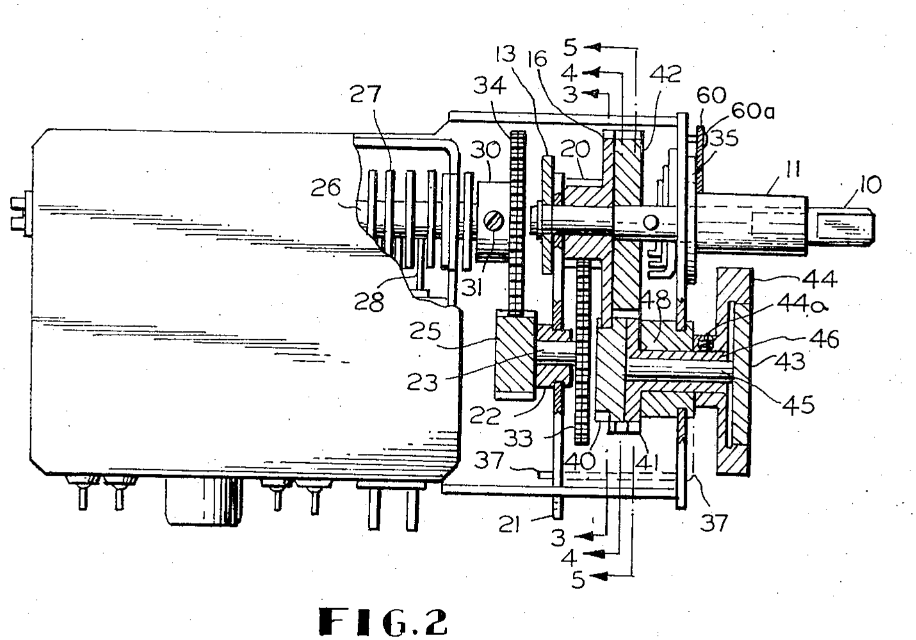
FIG. 2 is a plan view, partially in section, of the detent type UHF tuner of FIG. 1.

The invention will become fully apparent from the following detailed description of one embodiment of the invention taken in conjunction with the accompanying drawings, in which:

Referring to FIG. 1 and FIG. 2, a tuning shaft (10) is rotatably supported by a bracket (12) and a bearing plate 13) attached to the bracket (12). Said tuning shaft (10) has a detent cam (16) and a driving gear (20) fixed thereto. The detent element (16) has a plurality of equally divided gear teeth on the a periphery thereof. A leaf spring (17) is affixed by a set screw (19) at one end thereof to an upper plate (14) which is permanently affixed to the bracket (12). The other end of said leaf spring 17 has a hole therein, in which a steel ball 18 is fitted. The ball 18 is urged into the spaces between adjacent gear teeth of the detent element 16 by said leaf spring 17. When said tuning shaft 10 is rotated, one of two adjacent gear teeth pushes the steel ball 18 outwardly of the detent element 16 against the force of said leaf spring 17. Thus, said detent element 16, the leaf spring 17 and the steel ball 18 gives a step by step effect to the rotation of the tuning shaft (10). A tubular fine tuning shaft (11) is rotatably mounted on and concentric with the tuning shaft (10). Said fine tuning shaft (11) has a fine tuning cam (35) affixed to one end thereof. The rear surface of said fine tuning cam is flat and contacts the front surface of said bracket 12 (right side in FIG. 1). The front surface of said fine tuning cam 35 is pressed by a leaf spring 60, one end of which is fixed to said bracket 12 by screw 60*a*, so that the rotation of the fine tuning shaft 11 is restrained by the frictional force generated between said front side surface of the bracket 12 and rear side surface of the fine tuning cam 35, and between front side surface of the fine tuning cam 35 and the leaf spring 60. A pivotal lever (37) is pivotally mounted on a pin (36) fixed to the bracket (12). One end of the pivotal lever (37) is engaged with the peripheral surface of the fine tuning cam (35), and the other end of the pivotal lever (37) is bent and extends through a slot in bracket 12 and is engaged with the upper edge free end of a swinging lever (21). Said swinging lever (21) is pivotally mounted on the tuning shaft (10). The free end of the swinging lever (21) extends horizontally through an opening (62) in the bracket (12), and is biased upwards by a tension spring (38) connected thereto so as to be held in contact with said other end of lever 37. The other end of said spring (38) is anchored to a tab (39) provided on the upper plate (14). The position of the end of the spring 38 anchored on the tab 39 is to the right in FIG. 2 relative to the end of the spring (38) anchored on the free end of the swinging lever (21). Therefore, the swinging lever (21) is biased not only clockwise when seen from the right side in FIG. 1, but also towards the right in FIG. 2.

The clockwise rotation of the swinging lever (21) is restricted in such a way that the swinging lever (21) drives the pivotal lever (37) to press said one end thereof against the peripheral surface of the fine tuning cam (35), the rotation of which is frictionally resisted by the leaf spring (60). The movement of the swinging lever (21) towards the right by the spring (38) is restricted by the opening (62) so that the swinging lever (21) is held perpendicular to the tuning shaft (10) as shown in FIG. 2.

When the fine tuning shaft (11) is rotated by an operator, the fine tuning cam (35) drives the pivotal lever (37) to swing the swinging lever (21) against the biasing force of the spring (38), so that the rotation of the fine tuning shaft (11) is transmitted without lost motion into swinging motion of the swinging lever (21) around shaft 10. The swinging lever (21) has a metal bearing (22) affixed to a middle portion thereof, and a shaft (23) is rotatably journaled in said metal bearing (22). A pair of planetary gear means are mounted on said shaft (23) as described hereinafter.

At one end of the shaft (23) is mounted a large planetary gear means (33) which is comprise of split gears to prevent backlash. A small planetary gear (25) is fixed to the other end of the shaft (23) and is in mesh with a large driven gear means 34. Said large planetary gear means (33) is meshed with the driving gear (20) without backlash therebetween. The pitch diameters of the driving gear (20) and the large planetary gear means (33) are preferably the same as those of the small planetary gear (25) and the driven gear means (34) respectively. During the swinging motion of the swinging lever (21), the large planetary gear means (33) rotates on its own axis while rotating around the driving gear (20) since said gear (20) is subject to detent action by the pressing force of the leaf spring (17). At the same time, the small planetary gear (25) also rotates along with said large planetary gear means (33) since these gears are mounted on the shaft (23) and rotate as one body.

A UHF tuner body (15), which is a variable capacitance type, is fixed to a base portion of the bracket (12) by screws (not shown). Said UHF tuner body (15) is provided with a rotatable tuner control shaft (26) which has a plurality of rotor blades (27) affixed thereto. The UHF tuner body (15) has a plurality of stationary blades (28) mounted thereon, each of which is positioned side by side with one of the rotor blades (27) respectively.

The area of the rotor blades (27) and the stationary blades (28) opposing each other changes according to the rotation of the tuner control shaft (26), and the tuning frequency of the UHF tuner (15) changes in proportion to the angle of rotation of the tuner control shaft (26). The UHF tuner covers 70 television channels from No. 14 to No. 83 for 180° of rotation of the tuner control shaft (26). Therefore, a the angle of rotation corresponding to one channel is a slight angle of about 2.6°. The driven gear means (34) is affixed to one end of the tuner control shaft (26) by a set screw (31) through a boss (30) thereon. Said driven gear means (34) is comprised of split gears to prevent backlash. Since the small planetary gear (25) is meshed with the driven gear means (34) without backlash, the tuning frequency can be finely adjusted by slight rotation of the small planetary gear (25).

In the detent type UHF tuner constructed as described above, the tuning shaft (10) can be independently rotated through one detent angle, i.e., the angle between two detent receiving recesses, until the steel ball 18 falls into the following recess in the detent element (16) from the initial recess without driving the fine tuning shaft (11). During that time, the swinging lever (21) stands still, and rotation through one detent angle of the tuning shaft (10) is reduced by two steps through the driving gear (20), the large planetary gear means (33), the small planetary gear (25) and the driven gear means (34). Thus, the tuner control shaft (26) is stopped after rotation of 2.6° corresponding to one channel. Conversely speaking, this means that the rotation of the tuner control shaft (26) through 2.6° is enlarged by a couple of gear trains to a larger rotation angle of the tuning shaft (10). Therefore, it is possible to make the angle of rotation angle of the tuning shaft (10) between detent recesses about the same angle of rotation of a tuning shaft in a conventional VHF tuner so that it is easy to operate and tune the UHF tuner. These two parts of the gear train make possible a larger angle of rotation of the tuning shaft (10) under control of the detent means and smaller gear ratios between the driving gear (20) and the large planetary gear means (33) and between the small planetary gear (25) and the driven gear means (34), so that the tuning mechanism can be made compact.

When the fine tuning shaft (11) is rotated without the rotation of the tuning shaft (10), the fine tuning cam (35) drives the pivotal lever (37) to swing the swinging lever (21) against biasing force of the spring (38). Since the detent element (16) is held by the leaf spring (17) and the steel ball (18) at that time, the driving gear (20) can not rotate and the large planetary gear means (33) rotates around its own axis while rotating around the driving gear (20). Accordingly, the small planetary gear (25) rotates around its own axis while rotating around the driven gear means (34) so as to finely rotate the driven gear means (34) in a differential way.

Said detent type UHF tuner is provided with channel indicating means for indicating channel numbers, which means will be explained in more detail hereinafter.

Said channel indicating means comprises a first indicating disc (43), a second indicating disc (44), and driving means for rotating said discs.

Figure 3:
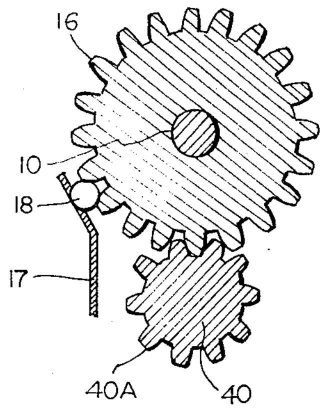
FIG. 3 is a sectional view of the channel indicating mechanism and detent means taken along the line 3—3 of FIG. 2.
Figure 4:
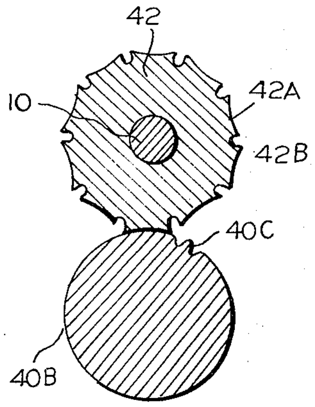
FIG. 4 is a sectional view of the channel indicating mechanism taken along the line 4—4 of FIG. 2.
Figure 5:
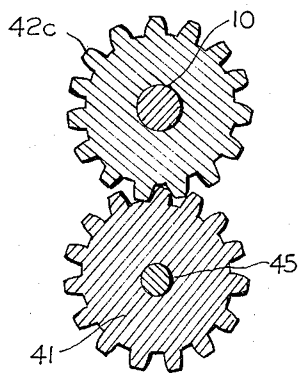
FIG. 5 is a sectional view of the channel indicating mechnism taken along the line 5—5 of FIG. 2.

Said driving means comprises a first driving element (40), a driven element (42), and a second driving element (41). Said first driving element (40) consists of a gear (40A) having 10 teeth mshed with the teeth of the detent element (16), and a Geneva driving gear (40B) integrally formed with said gear (40A) to rotate therewith as a single unit and having a protruding tab (40C) as shown in FIG. 3 and FIG. 4. Said driven element (42) consists of a Geneva driven gear (42A) having a plurality of recesses (42B) capable of engaging with said protruding tab (40C) of the Geneva driving gear (40B), and a gear (42C) integrally formed with said Geneva driven gear (42A) to rotate therewith as a single unit. Said driven element (42) is rotatably mounted on the tuning shaft (10). Said second driving element (41) is a gear which is meshed with the gear (42C) as shown in FIG. 5.

With reference to FIG. 2, said first indicating disc (43) is directly connected to said first driving element

(40) through a shaft (45). Said second indicating disc (44) is directly connected to said second driving element (41) to rotate therewith as a single unit around the shaft (45). These discs (43) and (45) are coaxially arranged and rotatably supported in a bearing (38) which is fixed to the bracket (12). Numbers 0–9 are provided on the face of the first indicating disc (43), and numbers 1–8 are provided on the face of the second indicating disc (45) as shown in FIG. 1. A number on the first indicating disc 43 and a number on the second indicating disc 44 are paired to indicate a channel number having two figures as will be explined hereinafter.

Upon one movement of the tuning shaft (10) under control of the detent means, the gear (40A) is rotated one tooth pitch by the detent element (16) so that the first indicating disc (43) is rotated through the same angle to move the numbers one-eighth of a rotation. At the same time, the Geneva driving gear (40B) rotates one-tenth of a full revolution. In every full revolution of said Geneva driving gear (40B), the protruding tab (40C) of the Geneva driving gear (40B) engages in one of the recesses (42B) of the Geneva driven gear (42A) so as to rotate the Geneva driven gear (42A) intermittently one pitch of its recesses. Upon rotation of the Geneva driven gear (42A), the second driving element (41) is rotated by the gear (42C) so that the second indicating disc (45) rotates one tenth of a rotation.

As described above, the first indicating disc (43) rotates one pitch for each detent contolled partial rotation of the tuning shaft (10), and the number on said disc (43) corresponds to the second or ones figure of the channel number. The second indicating disc (44) rotates one pitch for every 10 partial rotations of the tuning shaft (10), i.e., one full revolution of the first indicating disc (43), and the number on the second indicating disc (44) corresponds to the first or 10's figure of the channel number. Since the numbers 0 – 9 are provided on the first indicating disc (43) and the numbers 1–8 are provided on the second indicating disc (44), such channel indicating means can cover not only Japanese UHF television band but also United States UHF television band.

Since the gear (40A) is meshed with the detent element (16) having gear teeth, involute or cycloid, against which the steel ball (18) is urged to restrict the rotation of the tuning shaft (10), the first indicating disc (43) can be held securely. The Geneva gear system employed in this channel indicating means can prevent the second indicating disc (45) from rotating unless the protruding tab (40C) drives the recess (42B) to rotate the disc (44). Therefore, the second indicating disc (44) is also held securely. It will be apparent to those skilled in the art that various modifications may be made without departing from the spirit of the invention. The above described specific example is intended merely to illustrate various facets in a certain selective embodiment of the invention.

What is claimed is:

1. A channel indicating mechanism for a UHF tuner having a tuner control shaft adjustable to tune said UHF tuner to any one of the UHF television channels and tuning means having a tuning shaft coupled to and driving said tuner control shaft through a series of rotational steps of predetermined angles and a fine tuning shaft coupled to and continuously rotating said tuner control shaft a small rotational angle within the angle of any angular step, said indicating mechanism comprising:

a detent element mounted on said tuning shaft and having a plurality of gear teeth on the periphery thereof;

spring loaded detent means engaged between adjacent teeth of said detent element so as to impart a click motion during rotation of said tuning shaft; and channel indicating means with which said detent element teeth are meshed and driven step-by-step by said tuning shaft through said detent element upon rotation of said tuning shaft under the control of said detent means for indicating the channel to which the UHF tuner is tuned.

2. A channel indicating mechanism as defined in claim 1 wherein said channel indicating means comprises a first indicating disc for indicating one figure of the channel number, a second indicating disc arranged in the vicinity of said first indicating disc for indicating a second figure of the channel number, and driving means engaged with said detent element and coupled to said discs for rotating said first indicating disc upon rotation of said tuning shaft and also rotating said second indicating disc through a predetermined angle step-by-step for each revolution of said first indicating means, whereby the numbers on said first and second indicating discs can together indicate a channel number of two figures.

3. A channel indicating mechanism as defined in claim 2 wherein said driving means comprises a first driving element geared to said detent element and directly connected to said first indicating disc, a driven element rotatably mounted on said tuning shaft and geared to said first drawing element and rotated through a predetermined angle each time said first driving element has rotated one full revolution, and a second driving element geared to said driven element and directly connected to said second indicating disc, whereby said second indicating disc is rotated step-by-step through a predetermined angle by said second driving element through said first driving element, and said driven element.

* * * * *